United States Patent Office 3,407,139
Patented Oct. 22, 1968

3,407,139
FLUORESCENT MANGANESE ACTIVATED MAGNESIUM DIGALLATE PHOSPHOR COMPOSITION
Jesse J. Brown, Jr., Towanda, Pa., assignor to Sylvania Electric Products Inc., a corporation of Delaware
Filed Apr. 21, 1966, Ser. No. 544,294
4 Claims. (Cl. 252—301.4)

ABSTRACT OF THE DISCLOSURE

This invention relates to calcium digallate phosphors activated by manganese. The formula for this phosphor can be characterized as follows:

$$(Ca_xMn_y)Ga_4O_7$$

wherein the sum of $x$ and $y$ is between about 0.90 to 1.05 and wherein $y$ is between about 0.001 to 0.10.

---

It is useful as a color corrector in mercury lamps and as one of the components in a two-component white phosphor blend for fluorescent lamps or as a cathode ray phosphor.

*Description of the invention*

Figure 1:
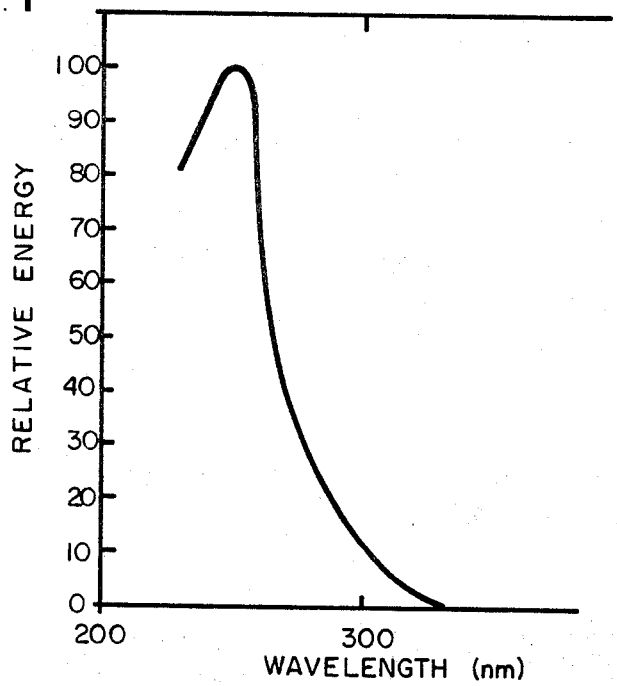
Figure 2:
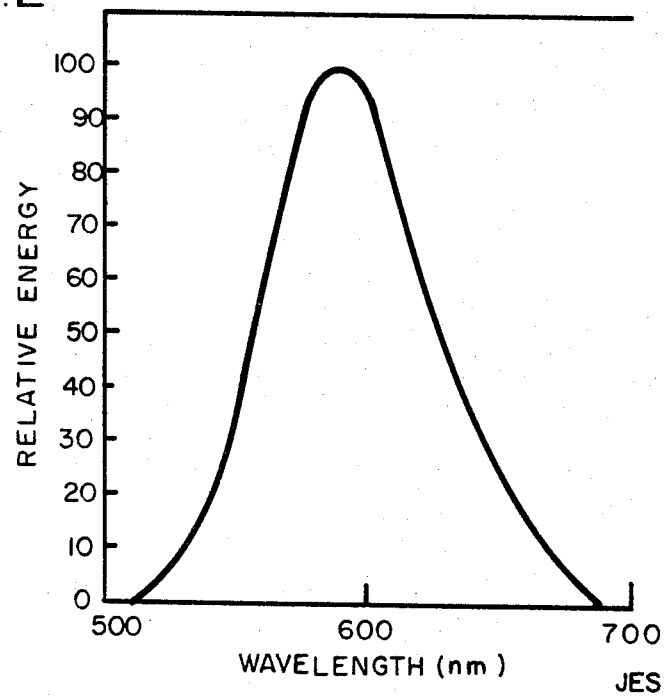

FIGURE 1 is the excitation spectrum of a calcium digallate phosphor activated by manganese and FIGURE 2 is the spectral energy distribution curve of this material.

In accordance with the present invention, the luminescent material may be prepared by solid state reaction of calcium carbonate and gallium oxide with the addition of the manganese activator in the form of manganese carbonate or any other well-known manganese salts. After blending, the mixture is heat-treated between 1000 and 1350° C. from 5 to 20 hours. A fairly bright yellow phosphor is developed at this point; however, a second heat treatment in a mildly reducing atmosphere (e.g., 0.01 to 1% $H_2$ in $N_2$) greatly improves the efficiency of the phosphor and reduces the manganese to the manganous valence state. This second heat treatment may vary from 1000 to 1350° C. and be as short as 30 minutes. For maximum brightness, air must be carefully excluded from the system until the preparation has cooled at room temperature.

As seen from FIGURE 1, the phosphor has a normalized peak excitation at approximately 250 nm. which is quite near the low pressure mercury line at 2537 A.

The following specific example is offered as an illustration of the preparation of these phosphor systems and is not intended to be limitative upon the claims.

EXAMPLE I

The following ingredients are combined in the solid state:

16.348 gm. $CaCO_3$
0.210 gm. $MnCO_3$
62.480 gm. $Ga_2O_3$

This is essentially equivalent to 0.98 mole CaO, 2.00 moles $Ga_2O_3$, and 0.01 mole MnO. The three components are thoroughly blended and heat-treated in air in open fused silica crucibles at 1200° C. for 17 hours, pulverized and refired at 1200° C. for 1 hour in an $N_2$–0.01% $H_2$ atmosphere. The preparation is allowed to cool to room temperature in the mildly reducing atmosphere with air being carefully excluded. The reacted product has essentially the matrix composition of $CaO \cdot 2Ga_2O_3$, wherein 0.01 mole of the calcium has been replaced by manganese.

It is apparent that modifications and changes can be made within the spirit and scope of the instant invention, but it is my intention, however, only to be limited by the scope of the appended claims.

As my invention, I claim:
1. A luminescent material consisting essentially of calcium digallate activated by manganese in sufficient quantities to produce luminescence.
2. The composition according to claim 1 wherein the calcium digallate is represented by the formula:

$$(Ca_xMn_y)Ga_4O_7$$

and the sum of $x$ and $y$ is between about 0.90 and 1.05.
3. The composition according to claim 1 wherein $y$ is between about 0.001 to 0.10.
4. The composition according to claim 3 wherein the manganese is divalent.

References Cited
UNITED STATES PATENTS
3,282,856   11/1966   Borchardt _____ 252—301.4

TOBIAS E. LEVOW, *Primary Examiner.*
ROBERT D. EDMONDS, *Assistant Examiner.*